T. T. Prosser.
Steam Generator.
N° 89,240. Patented Apr. 20, 1869.
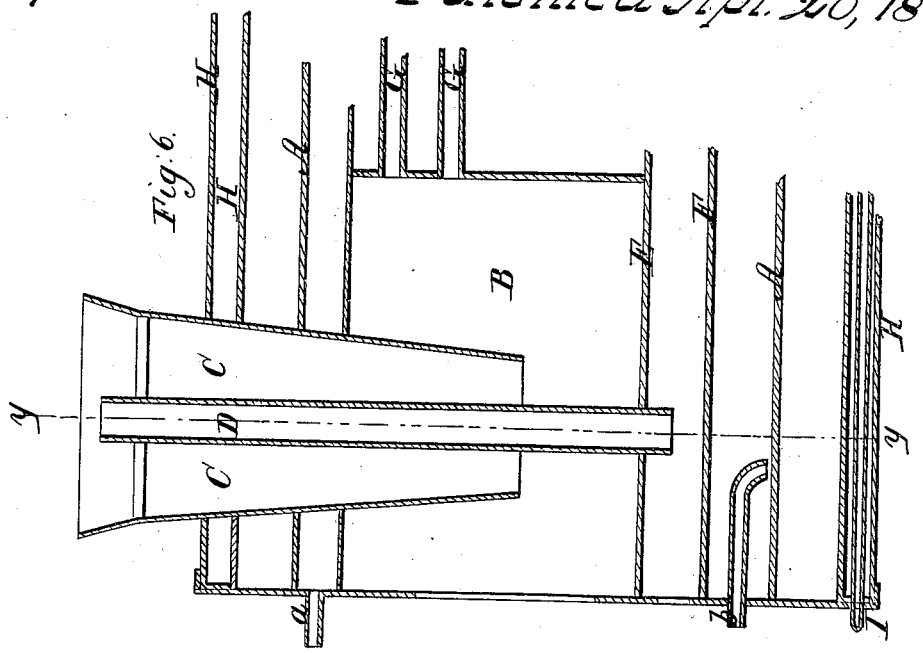
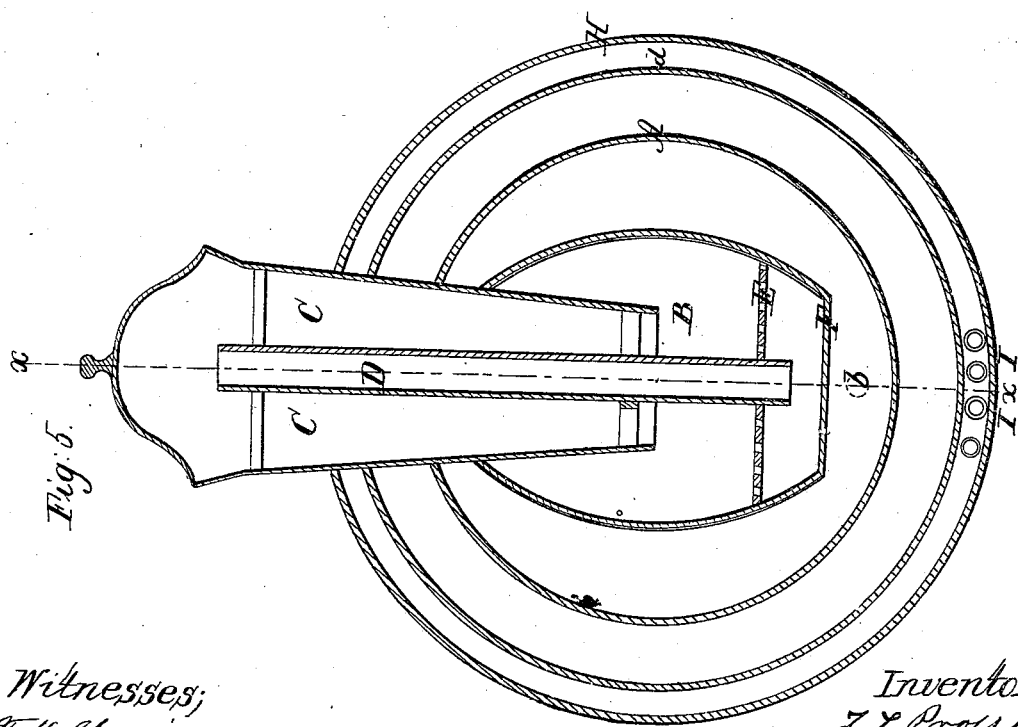
Witnesses:
Inventor:
T. T. Prosser

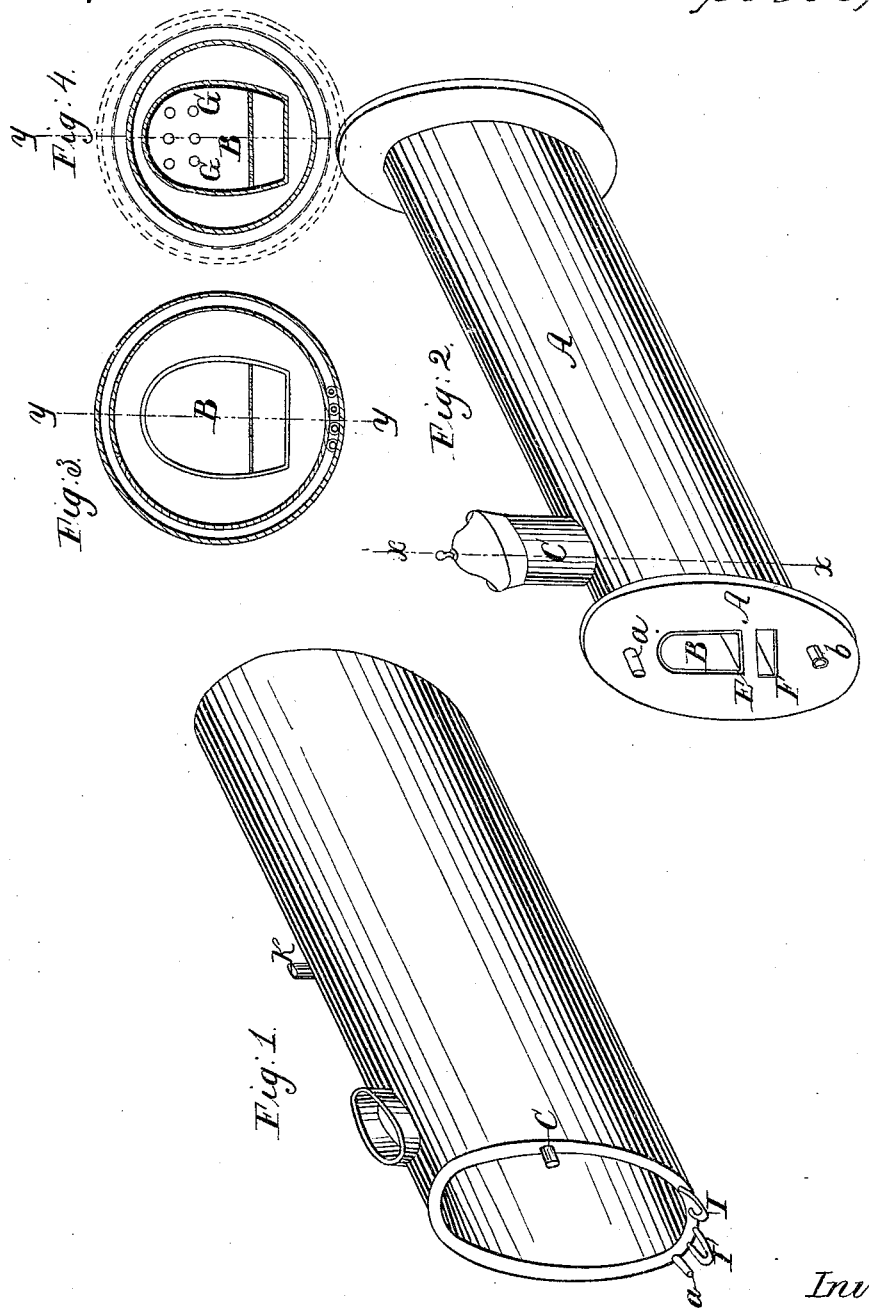

TREAT T. PROSSER, OF CHICAGO, ILLINOIS, ASSIGNOR TO HIMSELF AND HENRY WALLER, OF SAME PLACE.

*Letters Patent No. 89,240, dated April 20, 1869.*

IMPROVEMENT IN STEAM-GENERATORS.

The Schedule referred to in these Letters Patent and making part of the same.

*To all whom it may concern:*

Be it known that I, TREAT T. PROSSER, of Chicago, in the county of Cook, and State of Illinois, have invented a new and useful Improvement in Steam-Generators; and I do hereby declare that the following is a full, clear, and exact description of the same, reference being had to the annexed drawings, making part of this specification, in which—

Figure 1 is a perspective view of the steam-chamber which surrounds the generator.

Figure 2 is a perspective view of one form of generator to which my improvement is applicable.

Figure 3 is a vertical transverse section of the steam-chamber.

Figure 4 is a vertical transverse section of the generator, showing its position within the steam-chamber.

Figure 5 is a vertical transverse section on line $x\ x$ of fig. 2, showing the fuel-reservoir and the steam-chamber in their relation to the generator.

Figure 6 is a vertical longitudinal section on line $y\ y$ of fig. 4.

Corresponding letters refer to corresponding parts in the several figures.

The nature of my invention relates to the more perfect development and economical use of heat in generating steam, and consists in a mode of generating, using, and condensing such steam, so as to save and reuse, in continuous circulation, all the water of condensation, and the heat in the exhaust steam, except that portion lost by leakage and radiation.

After steam has been generated in the boiler, and has performed its labor in the engine, it is customary to throw it away, thus wasting both the heat and water of the exhaust steam.

To appreciate this great waste, it must be considered that this exhaust steam contains, when thus uselessly thrown away, all the heat that enters into and effects its expansion and temperature, represented by 1,200°, as the sum of what is termed the sensible and latent heat of steam, and to produce which a large amount of fuel has been necessarily required.

By the arrangement hereinafter described, this enormous waste of water and heat, and, consequently, of fuel, is, to a great extent, avoided, and other incidental benefits secured.

I arrange a reservoir, surrounding the boiler, at a proper distance from it, and extending its whole length, the outside of the reservoir being covered with felting, or any suitable non-conducting substance, so as to prevent radiation, the inside being coated with lamp-black, or such material as will best facilitate radiation.

Into this reservoir I conduct the exhaust steam from the engine, which, during its passage to the cylinder, and its expansion therein, and in the performance of labor after its connection with the heat in the boiler, has been cut off, and it has undergone a certain amount of expansion, and consequent reduction of temperature, by which its capacity for heat has been increased, it not being able to obtain such heat from the steam-reservoir or chamber, or its surroundings, condensation takes place, and thus water is formed, which, in its heated state, may be returned to the generator.

The constant discharge of exhaust steam from the engine into the reservoir continually augments the pressure. This pressure, according to a well-known law of steam, increases the capacity for heating and condensation in a corresponding degree, and the result is that condensation continues, and the water is constantly thrown down in the reservoir.

The feed-pump is connected with this reservoir, and the water of condensation is continually pumped out of it, and returned to the boiler, whence it had come in the form of steam.

By this process, the boiler is supplied with pure hot water, and an amount of heat conveyed into it nearly corresponding with the temperature of the exhaust steam. Thus very little heat or water is wasted, but both are used over and over again, the only loss being due to leakage and radiation.

The saving of fuel thus effected, it will be readily seen, must be very great, and the supply of the boiler with the water in its purified state, when condensed from steam, is, of itself, an important result.

Another great advantage arising from the use of this exhaust-steam reservoir is that it surrounds the boiler with a temperature sufficient to prevent radiation. Moreover, the heat radiating from the inner shell of the exhaust-steam reservoir is concentrated upon the outer surface of the steam-boiler, and thus the heat of the boiler, which generates the steam, is increased, and the fire materially aided in the production of steam. This radiation from the reservoir also becomes a source of condensation of the exhaust steam which it contains, and facilitates the return to the boiler of the heat and water, which are saved and utilized by this new process.

To illustrate the economical value of my improvement, I will suppose the pressure in the reservoir of exhaust steam to be raised to fifty pounds per square inch; the temperature corresponding is 283°. In order, then, that the engine should have an effective force of fifty pounds to the square inch, there should be a pressure in the boiler of one hundred pounds, with a temperature of 332°. Under these conditions, it will be seen that the difference of heat in the reservoir and boiler would be only 49°, and, therefore, leaving out the loss by radiation, to obtain this effective force in the engine of fifty pounds, it would only be necessary to raise the heat from the fire 49°, instead of the usual amount of 332° by the present mode; that is to say, my engine, when properly in operation, will require only a fractional part of the fuel consumed by the engine now in use.

By arranging a chamber for superheating the steam,

I can obtain about the same result with a much less pressure of steam in the boiler and reservoir.

From this arrangement, it is apparent that the heat of expansion, or what is termed latent heat, as distinguished from sensible heat, may be controlled and utilized, for, as condensation occurs, it is liberated, and takes the form of sensible heat.

Should it at any time become desirable to reduce the temperature in the exhaust-steam reservoir below its natural point, when operating as above described, it can be done by conducting the air, in its passage to the furnace, through pipes arranged in the reservoir for that purpose.

Besides accomplishing the desired reduction in the reservoir, this device will be economical in raising the temperature of the atmosphere prior to its admission to the furnace, and to that extent increasing the heat therein without additional fuel.

A, in the drawings, is a steam-generator, which may be of any approved construction, but which, in the example shown, is a cylinder, having tubes extending from its fire-box, which is located in its front end, to its rear end, where they discharge their contents into the atmosphere, or it may be to any other desired location.

B is a furnace, located within the end of the generator, to the rear end of which the tubes are secured, as clearly shown in fig. 6 of the drawings.

C is a magazine for coals, which is placed with its lower end within the furnace, but some distance above the grate, while it extends upward through the generator, and through the steam-chamber, terminating some distance above such chamber, where it is supplied with a cap or cover, which may be removed when fresh coals are to be supplied to the furnace, but which at other times is tightly closed, to prevent the escape of gas at that point.

D is a pipe, which extends from the upper portion of the coal-reservoir to the space below the grate, its office being to carry any gases which may collect within the reservoir down below such grate, when they may be mingled with a fresh supply of oxygen, preparatory to being passed up through the incandescent fuel upon the grate, and thus ignited and consumed before leaving the generator or boiler.

E is a grate, which is placed in the generator in the usual manner.

F is the air-space below the grate, it also serving the purpose of an ash-pit.

G are flues or tubes, through which the products of combustion pass from the fire-box to the rear end of the boiler.

H is a steam-chamber or reservoir, which, in this instance, is composed of sheets of metal, made so as to occupy positions concentric to each other, and so as to leave the desired space between them for the reception of the steam as it is exhausted from the engine.

This reservoir is made to surround the boiler or generator, and it is to be so much longer than such boiler as to leave a space or chamber of several inches between the two, which space forms a hot-air chamber, for the purpose of preventing the radiation of heat from the boiler, and also for the purpose of allowing the radiant heat from the interior surface of the steam-reservoir to be concentrated upon the outer surface of such boiler, and thus aid in the generation of steam therein.

The ends of this chamber are closed tightly, by means of the projecting portions of the heads of the boiler, as shown in fig. 2 of the drawings.

I I are tubes, which pass through the space between the sheets of the steam-chamber, which are for the purpose of passing a current of air through such chamber, in the event of its becoming desirable to reduce the temperature of such chamber at any time, in which case the air thus passed may be used to support combustion upon the grate, and thus any heat which it may have accumulated during its passage will be utilized.

K is a pipe, which is attached to the steam-reservoir, and to which a safety-valve may be attached, in the event of it being desirable to indicate the pressure therein.

$a$ is a pipe, through which the steam may be conveyed to the engine from the generator.

$b$ is a pipe, through which water is to be fed to the generator.

$c$ is a pipe, through which water is fed to the steam-chamber preparatory to being heated for admission to the boiler.

$d$ is a pipe, through which the water is taken from the steam-chamber preparatory to being injected into the boiler.

I am aware that steam-generators have heretofore been constructed with a steam-space surrounding them, and in which the steam is allowed to come in actual contact with such boiler. Such an arrangement, therefore, I do not claim; but, having thus described my invention, What I do claim, and desire to secure by Letters Patent, is—

1. A chamber or reservoir for exhaust steam, surrounding a steam-generator, and having a space interposed between said chamber and generator, within or through which the heat is radiated from the inner surface of the said chamber, upon the outer surface of the generator, and whereby the exhaust steam is prevented from coming in contact with the generator, substantially as shown and described.

2. The combination of a steam-generator with a reservoir or chamber, which surrounds the same, for the purpose of receiving the exhaust steam from the engine, they being so arranged as to leave an intervening chamber, A, between them, substantially as shown and described.

3. The combination of the boiler A, the steam-reservoir or chamber H, the coal-reservoir C, and gas-conducting pipe D, substantially as shown and described.

In testimony whereof, I have signed my name to this specification, in the presence of two subscribing witnesses.

T. T. PROSSER.

Witnesses:
F. H. SPRAGUE,
C. F. CLAUSEN.